US010547046B2

(12) United States Patent
Merrill et al.

(10) Patent No.: US 10,547,046 B2
(45) Date of Patent: Jan. 28, 2020

(54) HIGH ENERGY/POWER DENSITY NICKEL OXIDE/HYDROXIDE MATERIALS AND NICKEL COBALT OXIDE/HYDROXIDE MATERIALS AND PRODUCTION THEREOF

(71) Applicant: Lawrence Livermore National Security, LLC, Livermore, CA (US)

(72) Inventors: Matthew Merrill, Dublin, CA (US); Michael Stadermann, Pleasanton, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 8 days.

(21) Appl. No.: 15/043,226

(22) Filed: Feb. 12, 2016

(65) Prior Publication Data

US 2016/0164072 A1   Jun. 9, 2016

Related U.S. Application Data

(62) Division of application No. 13/685,567, filed on Nov. 26, 2012, now abandoned.

(Continued)

(51) Int. Cl.
*H01M 4/00* (2006.01)
*H01M 4/04* (2006.01)
(Continued)

(52) U.S. Cl.
CPC ......... *H01M 4/0452* (2013.01); *H01M 4/525* (2013.01); *H01M 10/30* (2013.01);
(Continued)

(58) Field of Classification Search
CPC ...... H01M 4/0452; H01M 10/30; H01M 4/38; H01M 4/366; H01M 4/525; H01M 2220/30; H01M 4/32; B82Y 30/00; Y10S 977/755
See application file for complete search history.

(56) References Cited

U.S. PATENT DOCUMENTS 3,873,368 A   3/1975   Pickett
4,460,543 A   7/1984   Glaeser
(Continued)

FOREIGN PATENT DOCUMENTS

CN   1884089 A   12/2006
CN   1967906 A   5/2007
(Continued)

OTHER PUBLICATIONS

Steinz et al., "The effect of current and nickel nitrate concentration on the deposition of nickel hydroxide films", Journal of the Electrochemical Society, vol. 142, No. 4, Apr. 1995, p. 1084-1089 (Year: 1995).*

(Continued)

*Primary Examiner* — Nicholas P D'Aniello
(74) *Attorney, Agent, or Firm* — Zilka-Kotab P.C.

(57) ABSTRACT

According to one embodiment, a method includes forming a nickel oxide/hydroxide active film onto a substrate from a solution including a nickelous salt and an electrolyte, where the nickel oxide/hydroxide active film has a physical characteristic of maintaining greater than about 80% charge over greater than 500 charge/discharge cycles, and wherein the nickel oxide/hydroxide active film has a physical characteristic of storing electrons at greater than about 0.5 electron per nickel atom.

20 Claims, 9 Drawing Sheets

Related U.S. Application Data

(60) Provisional application No. 61/565,444, filed on Nov. 30, 2011.

(51) Int. Cl.
    *H01M 4/525*     (2010.01)
    *H01M 10/30*     (2006.01)
    *B82Y 30/00*     (2011.01)

(52) U.S. Cl.
    CPC .......... *B82Y 30/00* (2013.01); *H01M 2220/30* (2013.01); *Y10S 977/755* (2013.01)

(56) References Cited

U.S. PATENT DOCUMENTS

| | | | |
|---|---|---|---|
| 4,552,821 A | | 11/1985 | Gibbard et al. |
| 4,603,094 A | | 7/1986 | Yasuda |
| 4,713,126 A | | 12/1987 | Woidt et al. |
| 4,844,999 A | | 7/1989 | Oshitani et al. |
| 5,783,334 A | | 7/1998 | Yasuda |
| 5,863,676 A | | 1/1999 | Charkey et al. |
| 5,955,219 A | * | 9/1999 | Nishijima ............ H01M 4/485 423/641 |
| 6,156,454 A | * | 12/2000 | Bernard .................. H01M 4/52 29/623.1 |
| 6,338,917 B1 | | 1/2002 | Maeda et al. |
| 7,405,172 B2 | | 7/2008 | Shigematsu et al. |
| 8,048,560 B2 | | 11/2011 | Nunome et al. |
| 2006/0257734 A1 | | 11/2006 | Obata et al. |
| 2008/0008937 A1 | * | 1/2008 | Eylem .................... H01M 2/16 429/218.1 |
| 2009/0023068 A1 | | 1/2009 | Shimamura et al. |
| 2009/0272949 A1 | | 11/2009 | Buttry |
| 2010/0068623 A1 | | 3/2010 | Braun et al. |
| 2011/0171524 A1 | | 7/2011 | Shimamura et al. |
| 2013/0136991 A1 | | 5/2013 | Merrill et al. |

FOREIGN PATENT DOCUMENTS

| | | |
|---|---|---|
| CN | 101083338 A | 12/2007 |
| CN | 101694893 A | 4/2010 |
| CN | 101728576 A | 6/2010 |
| CN | 101752628 A | 6/2010 |
| CN | 101752629 A | 6/2010 |
| CN | 101794913 A | 8/2010 |
| CN | 102306764 A | 1/2012 |
| EP | 0869569 A1 | 10/1998 |
| EP | 0872904 A2 | 10/1998 |
| EP | 1139469 A1 | 10/2001 |
| EP | 1176649 A1 | 1/2002 |
| EP | 1560281 A1 | 8/2005 |
| EP | 1717890 A1 | 11/2006 |
| EP | 1724859 A1 | 11/2006 |
| JP | S5673866 A | 6/1981 |
| JP | S56126266 A | 10/1981 |
| JP | S577064 A | 1/1982 |
| JP | S579068 A | 1/1982 |
| JP | S5769677 A | 4/1982 |
| JP | S57191958 A | 11/1982 |
| JP | S58152372 A | 9/1983 |
| JP | S5916271 A | 1/1984 |
| JP | S5942779 A | 3/1984 |
| JP | S5942780 A | 3/1984 |
| JP | S59103278 A | 6/1984 |
| JP | S59205155 A | 11/1984 |
| JP | S60249245 A | 12/1985 |
| JP | S63124378 A | 5/1988 |
| JP | H1125966 A | 1/1999 |
| JP | 2001040597 A | 2/2001 |
| WO | 8400642 A1 | 2/1984 |
| WO | 9208251 A1 | 5/1992 |
| WO | 9844579 A1 | 10/1998 |
| WO | 03073528 A2 | 9/2003 |
| WO | 2005112155 A1 | 11/2005 |
| WO | 2008075457 A1 | 6/2008 |

OTHER PUBLICATIONS

Feng et al., "Electrochemical properties of a LaNi4.7a10.3 alloy used for the negative electrode in nickel/metal hydride batteries," Journal of New Materials for Electrochemical Systems 2, 1999, pp. 45-50.
Iwakura et al., "Nickel/Metal Hydride Cells Using an Alkaline Polymer Gel Electrolyte Based on Potassium Salt of Crosslinked Poly(acrylic acid)," Electrochemistry, vol. 69, No. 9, 2001, pp. 659-663.
Hirota et al., "Development of Ni/MH AA Size Cells Using V—Ti—Zr—Ni Type Alloys as Negative Electrodes," Electrochemical Society Proceedings, vol. 92-5, 1992, pp. 210-214.
Statement of Relevance of Non-Translated Foreign Document JPS579068.
Statement of Relevance of Non-Translated Foreign Document JPS5673866.
Statement of Relevance of Non-Translated Foreign Document JPS5942780.
Statement of Relevance of Non-Translated Foreign Document JPS5942779.
Statement of Relevance of Non-Translated Foreign Document JPS57191958.
Statement of Relevance of Non-Translated Foreign Document JP2001040597.
Statement of Relevance of Non-Translated Foreign Document JPS58152372.
Statement of Relevance of Non-Translated Foreign Document JPS5916271.
Statement of Relevance of Non-Translated Foreign Document JPS60249245.
Statement of Relevance of Non-Translated Foreign Document JPS59205155.
Statement of Relevance of Non-Translated Foreign Document JPS59103278.
Statement of Relevance of Non-Translated Foreign Document JPS56126266.
Statement of Relevance of Non-Translated Foreign Document JPS577064.
Statement of Relevance of Non-Translated Foreign Document JPS5769677.
Statement of Relevance of Non-Translated Foreign Document JPS63124378.
Merrill et al., U.S. Appl. No. 13/685,567, filed Nov. 26, 2012.
Restriction Requirement from U.S. Appl. No. 13/685,567, dated May 27, 2015.
Non-Final Office Action from U.S. Appl. No. 13/685,567, dated Aug. 6, 2015.
Final Office Action from U.S. Appl. No. 13/685,567, dated Dec. 4, 2015.
Carron et al., "Surface enhanced Raman scattering and cyclic voltammetry studies of synergetic effects in the corrosion inhibition of copper by polybenzimidazole and mercaptobenzimidazole at high temperature," Journal of Materials Science, vol. 28, 1993, pp. 4099-4103.
Cui et al., "Effects of oxide additions on electrochemical hydriding and dehydriding behavior of Mg2Ni-type hydrogen storage alloy electrode in 6 M KOH solution," Electrochimica Acta, vol. 44, 1998, pp. 711-720.
Do et al.. "Optimization for the Formation of Metal Hydride Electrode Used in Ni/MH Batteries," Advanced Materials Research. vol. 306-307, 2011, pp. 151-154.
Inoue et al., "Preparation and electrochemical characterization of Mg2Ni alloys with different crystallinities," Electrochemica Acta, vol. 43, No. 14-15, 1998, pp. 2221-2224.
Iwakura et al., "Charge-Discharge and Capacity Retention Characteristics of New Type Ni/MH Batteries Using Polymer Hydrogel Electrolyte," Journal of The Electrochemical Society, vol. 150, No. 12, 2003, pp. A1623-A1627.
Iwakura et al., "Suppression of electrolyte creepage with polymer hydrogel electrolyte for nickel/metal hydride batteries," Journal of Applied Electrochemistry, vol. 35, 2005, pp. 293-295.

(56) References Cited

OTHER PUBLICATIONS

Iwakura et al., "The possible use of polymer gel electrolytes in nickel/metal hydride battery," Solid State Ionics, vol. 148, 2002, pp. 487-492.

Khaldi et al., "Corrosion effect on the electrochemical properties of LaNi3.55MnOAAl0.3CoO.75 and LaNi3.55MnOAAl0.3FeO.75 negative electrodes used in Ni-MH batteries," Material Science, vol. 175, Nand Engineering B, vol. 175, 2010, pp. 22-28.

Khaldi et al., "Effect of partial substitution of Co with Fe on the properties of LaNi3.55MnOAAl0.3CoO.75-xFex (x=O, 0.15,0.55) alloys electrodes," Journal of Alloys and Compounds, vol. 360, 2003, pp. 266-271.

Suda et al., "Catalytic generation of hydrogen by applying fluorinated-metal hydrides as catalysts," Applied Physics A, vol. 72, 2001, pp. 209-212.

Tadokoro et al.. "Development of Hydrogen Absorbing Alloys for Nickel Metal Hydride Secondary Batteries," Electrochemical Society Proceedings, vol. 92-5, 1992, pp. 92-95.

Weng et al., "Lead Acid-NiMH Hybrid Battery System Using Gel Electrolyte," ECS Trans., vol. 41, No. 13, 2012 pp. 133-143.

Zhang et al., "Effect of Si on electrochemical hydrogen storage properties of crystalline Co.," International Journal of Hydrogen Energy, vol. 33, 2008, pp. 1317-1322.

Zhao et al., "The relationship of spherical nano-Ni(OH)2 microstructure with its voltammetric behavior," Journal of Solid State Electrochem, vol. 10, 2006, pp. 914-919.

Zhu et al., "Possible use of ferrocyanide as a redox additive for prevention of electrolyte decomposition in overcharged nickel batteries," Electrochemica Acta, vol. 48, 2003, pp. 4033-4037.

Nethravathi et al., "Nanocomposites of a-hydroxides of nickel and cobalt by delamination and co-stacking: Enhanced stability of a-motifs in alkaline medium and electrochemical behaviour," Journal of Power Sources, vol. 172, May 2007, pp. 970-974.

Coates et al., "Nickel-Zinc Batteries," Handbook of Batteries, 2002, pp. 1-37.

ZImmerman, A., "Chapter 4: The Nickel Electrode," Nickel-Hydrogen Batteries: Principles and Practice, 2009, pp. 71-148.

Hu et al., "Anodic deposition of nickel oxides for the nickel-based batteries," Journal of Power Sources, vol. 111, 2002, pp. 137-144.

Hu et al., "Ideally Pseudocapacitive Behavior of Amorphous Hydrous Cobalt-Nickel Oxide Prepared by Anodic Deposition," Electrochemical and Solid State Letters, vol. 5, No. 3, 2002, pp. A43-A46.

Wu et al., "Anodically potentiostatic deposition of flaky nickel oxide nanostructures and their electrochemical performances," International Journal of Hydrogen Energy, vol. 33, 2008, pp. 2921-2926.

Wu et al., "Capacitive Behavior of Porous Nickel Oxide/Hydroxide Electrodes with Interconnected Nanoflakes Synthesized by Anodic Electrodeposition," Journal of the Electrochemical Society, vol. 155, No. 11, 2008, pp. A798-A805.

Wu et al., "Nickel oxide film with open macropores fabricated by surfactant-assisted anodic deposition for high capacitance supercapacitors," ChemComm, vol. 46, 2010, pp. 6968-6970.

Zhang et al., "Three-dimensional bicontinuous ultrafast-charge and discharge bulk battery electrodes," Nature Nanotechnology, Mar. 20, 2011, pp. 1-5.

\* cited by examiner

400

Form the nickel oxide/hydroxide active film onto a substrate from a solution containing a nickelous salt and an electrolyte, where the nickel oxide/hydroxide active film has a physical characteristic of maintaining greater than about 80% charge over greater than 500 charge/discharge cycles, and where the nickel oxide/hydroxide active film has a physical characteristic of storing electrons at greater than about 0.5 electron per nickel atom. ⟶ 402

FIG. 4

HIGH ENERGY/POWER DENSITY NICKEL OXIDE/HYDROXIDE MATERIALS AND NICKEL COBALT OXIDE/HYDROXIDE MATERIALS AND PRODUCTION THEREOF

RELATED APPLICATIONS

This application is a divisional of U.S. patent application Ser. No. 13/685,567, filed on Nov. 26, 2012, which claims priority to U.S. Provisional Application No. 61/565,444, filed Nov. 30, 2011, the contents of each of which are herein incorporated by reference in their entirety.

The United States Government has rights in this invention pursuant to Contract No. DE-AC52-07NA27344 between the United States Department of Energy and Lawrence Livermore National Security, LLC for the operation of Lawrence Livermore National Laboratory.

FIELD OF THE INVENTION

The present invention relates to high energy/power density materials, and more particularly to nickel oxide/hydroxide and nickel-cobalt oxide/hydroxide materials and related methods and/or uses.

BACKGROUND

Rapid technological developments in the electronics and computer industry have created a large consumer market for a variety of batteries. For example, batteries are used to power almost every portable electronic device, such as cell phones, laptop computers, camcorders, portable radios, cameras, etc. Consequently, the demand for compact, high-energy density batteries has been steadily increasing.

Nickel (III) oxide/hydroxide (NiOOH) is often used as the positive electrode, e.g. the cathode, in batteries and capacitors. When a battery is discharged, nickel (III) oxide-hydroxide is reduced to nickel(II) hydroxide. When the battery is overcharged, oxygen is produced at the nickel electrode and may recombine with any hydrogen present to form water. The simplified, representative electrochemical reactions at a nickel oxide/hydroxide electrode are as follows:

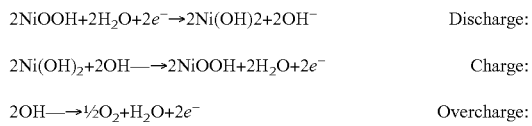

However, conventional nickel oxide-hydroxide electrodes generally exhibit a serious deficiency with regard to charge retention.

SUMMARY

According to one embodiment, a method includes forming a nickel oxide/hydroxide active film onto a substrate from a solution including a nickelous salt and an electrolyte, where the nickel oxide/hydroxide active film has a physical characteristic of maintaining greater than about 80% charge over greater than 500 charge/discharge cycles, and wherein the nickel oxide/hydroxide active film has a physical characteristic of storing electrons at greater than about 0.5 electron per nickel atom.

Other aspects and embodiments of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, reference should be made to the following detailed description read in conjunction with the accompanying drawings.

FIG. 4 shows a flowchart of a method for forming a high energy/power density material including at least a nickel oxide/hydroxide active film according to one embodiment.

DETAILED DESCRIPTION

Figure 1:
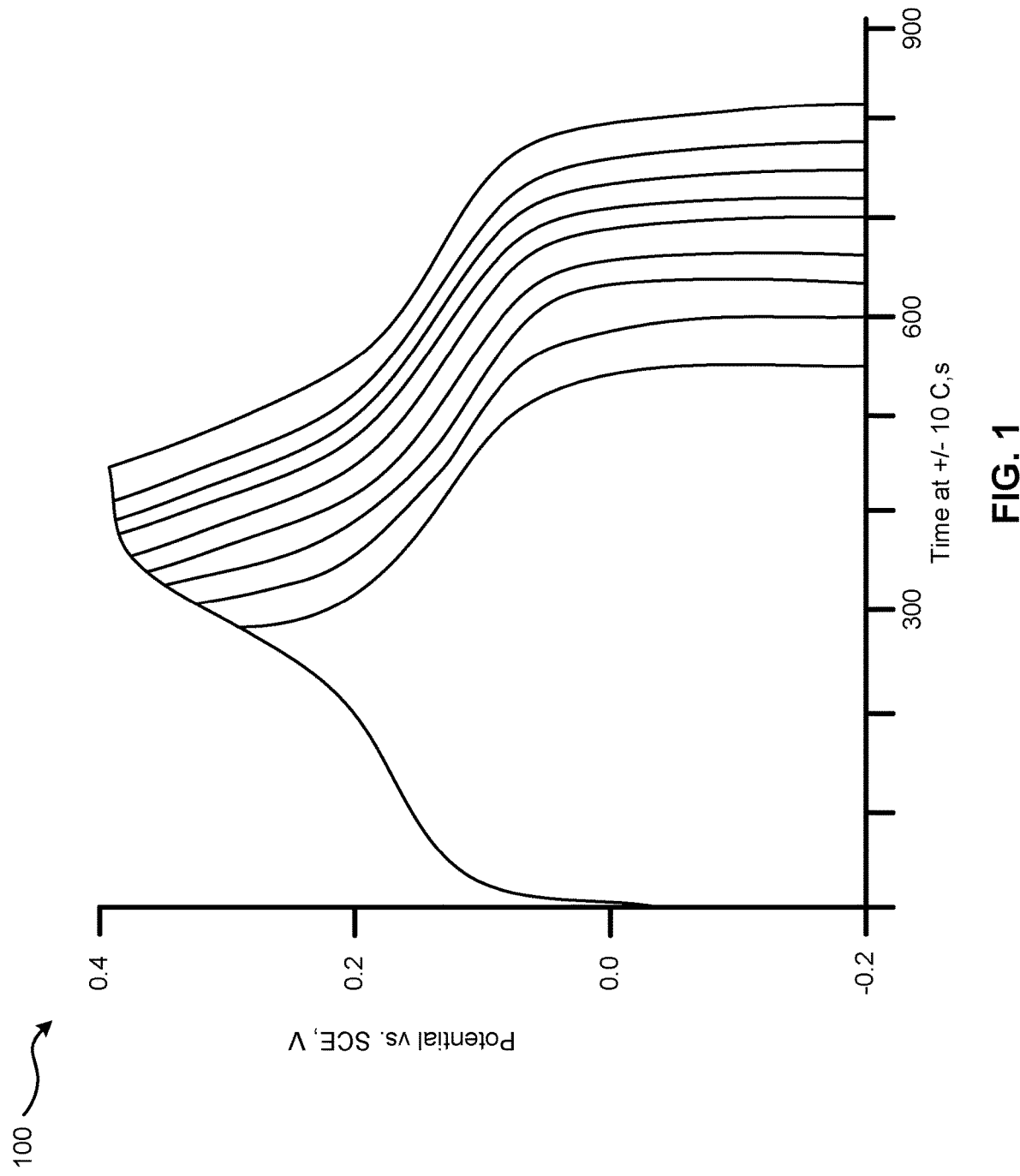
FIG. 1 shows plots of the charge/discharge curves for a nickel-cobalt oxide/hydroxide active film.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of high energy/power density nickel oxide/hydroxide and nickel-cobalt oxide/hydroxide materials and/or related systems and methods.

According to one general embodiment, a material includes a nickel oxide/hydroxide active film, wherein the nickel oxide/hydroxide active film has a physical characteristic of maintaining greater than about 80% charge over greater than 500 charge/discharge cycles, and wherein the nickel oxide/hydroxide active film has a physical characteristic of storing electrons at greater than about 0.5 electron per nickel atom.

Conventional nickel electrodes generally consist of a nickel oxide-hydroxide slurry or paste pressed into a sintered or nonsintered nickel foam current collector. However these conventional electrodes are often not compatible with modern current collectors, e.g. carbon-based and other types of current collectors, especially those possessing smaller and smaller pore sizes, as the active nickel material's particles are too large to be mechanically introduced into said pores. Furthermore, conventional nickel electrodes generally exhibit poor charge retention and energy densities.

Embodiments of the present invention overcome the aforementioned drawbacks by providing high energy/power density materials with physical characteristics including surprisingly high and improved charge retentions, charge/discharge rates, charge efficiencies, thermal management and cycle lives. The high energy/power density materials may constitute the charge storage material (e.g. the active material) for use in Ni cathodes of various battery formats, including, but not limited to, nickel-zinc, nickel-cadmium, nickel-metal hydride, nickel-$H_2$, rechargeable batteries, etc. as well as various supercapacitors and pseudocapacitors.

According to one embodiment, a material, e.g. a high energy/power density material, includes a nickel oxide/hydroxide active film. The nickel oxide/hydroxide active film has a physical characteristic of maintaining greater than about 80% charge over greater than 500 charge/discharge cycles. Stated another way, the nickel oxide/hydroxide film has a physical characteristic of being rechargeable to greater than 80% of an initial charge storage capacity over greater than 500 charge/discharge cycles. As used herein, a charge/discharge cycle refers to a cycle wherein the battery is fully discharged, i.e. attains an about 100% depth of discharge, and is subsequently charged to attain an about 100% state of charge.

In one approach, the nickel oxide/hydroxide film may have a charge/discharge rate of greater than about 100 C. The rate of attaining a 100% state of charge (or discharge) over a one hour time span corresponds to a rate of 1 C. Accordingly, a nickel oxide/hydroxide film having a charge/discharge rate of about 100 C may be able to attain a 100% state of charge/discharge in about 36 seconds. In another approach, the nickel oxide/hydroxide film may have a charge/discharge rate of greater than about 1000 C. Therefore, a nickel oxide/hydroxide film having a charge/discharge rate of about 1000 C may be able to attain a 100% state of charge/discharge in about 3.6 seconds. In other approaches, the charge/discharge rate may be in a range between 100 C and 1000 C.

In various embodiments, the nickel oxide/hydroxide active film may also have a physical characteristic of storing electrons at greater than about 0.5 electron per nickel atom. Additionally, it has been surprisingly found that, in various approaches, the nickel oxide/hydroxide active film may have a physical characteristic of storing electrons at equal to or greater than 1.25 electrons per nickel atom.

In yet another approach, the nickel oxide/hydroxide active film may have a thickness of about 20 to about 200 nm. According to an additional approach, the nickel oxide/hydroxide film may have a thickness of about 40 nm to about 100 nm.

In a further approach, the nickel oxide/hydroxide active film may have a physical characteristic of formation from electrodeposition, preferably anodic electrodeposition. For example, the nickel oxide/hydroxide active film may have a deposition thickness that is substantially uniform, such that a deposition thickness, e.g. in a thickness range of about 50 nm to 100 nm, may vary less than about ±1 nm along substantially all codeposited portions thereof, e.g., along at least 85%, preferably at least 90%, of the codeposited portions.

In additional approaches, the high energy/power density material may include a porous substrate upon which the nickel oxide/hydroxide active film is deposited, preferably directly, thereupon. In some approaches the porous substrate may have pore sizes of about 0.1 to 1 µm. The pores sizes and distances between the pores in the porous substrate may also be uniform in more approaches. In alternate embodiments, the substrate may have other configurations, such as posts, ridges and channels, etc. Void spaces in such alternate embodiments may have similar dimensions as those set forth herein.

Moreover, in more approaches the substrate may include a porous carbon based structure. For example, in one approach, the substrate may include highly oriented pyrolytic graphite. In yet another approach, the substrate may include nickel such as metallic nickel, alloys of nickel (e.g. nickel aluminum), etc.

According to one embodiment, the nickel oxide/hydroxide film may include cobalt, resulting in a nickel-cobalt oxide/hydroxide active film. In one approach, the nickel-cobalt oxide/hydroxide active film may comprise a cobalt (Co) to nickel (Ni) ratio in a range of about 2:1 to about 1:2. In some approaches, the average oxidation state of Co and Ni in the nickel-cobalt oxide/hydroxide active film may be $2^+$, $3^+$ or a combination thereof.

In another approach, the nickel-cobalt oxide/hydroxide active film may have a thickness of about 20 to about 200 nm, about 40 nm to about 100 nm, etc.

In yet another approach, the nickel-cobalt oxide/hydroxide active film may have a physical characteristic of formation from electrodeposition, preferably anodic electrodeposition. For example, in some approaches, the nickel-cobalt oxide/hydroxide active film may have a deposition thickness that is substantially uniform, meaning that the deposition thickness may vary less than about ±1 nm along substantially all codeposited portions thereof.

In some approaches, the nickel-cobalt oxide/hydroxide active film may have a physical characteristic of storing electrons at equal to or greater than 1.25 electrons per nickel atom. In more approaches the nickel-cobalt oxide/hydroxide active film may have a physical characteristic of storing electrons at 1.33 electrons per nickel atom.

According to another approach, the nickel-cobalt oxide/hydroxide film may have a charge/discharge rate of greater than about 10 C. According to yet another approach, the nickel-cobalt oxide/hydroxide film may have a charge/discharge rate of greater than about 100 C. According to a further approach, the charge/discharge rate of the nickel-cobalt oxide/hydroxide may be in the range of 100 C and 1000 C.

In additional approaches, the nickel-cobalt oxide/hydroxide active film may be capable of a 100% depth of discharge at any discharge rate. Nonetheless, the material is able to be re-charged after reaching the 100% depth of discharge. The capability of the nickel-cobalt oxide/hydroxide active film to undergo 100% depth of discharge was surprisingly discovered by the inventors and was neither expected nor predictable based on the current literature.

In yet further approaches, it has been surprising and unexpectedly found that the nickel-cobalt oxide/hydroxide active film may be substantially stable. As used herein, stability is defined as the ability to discharge the same amount of charge through repeated charge/discharge cycles. For example, FIG. 1 depicts a plot 100 of the charge/discharge curves for the nickel-cobalt oxide/hydroxide active film according to another embodiment. As shown in FIG. 1, the curve/discharge curves for nickel-cobalt oxide/hydroxide are substantially symmetric, which is indicative of the stability of an exemplary nickel-cobalt oxide/hydroxide active film.

Figure 2:
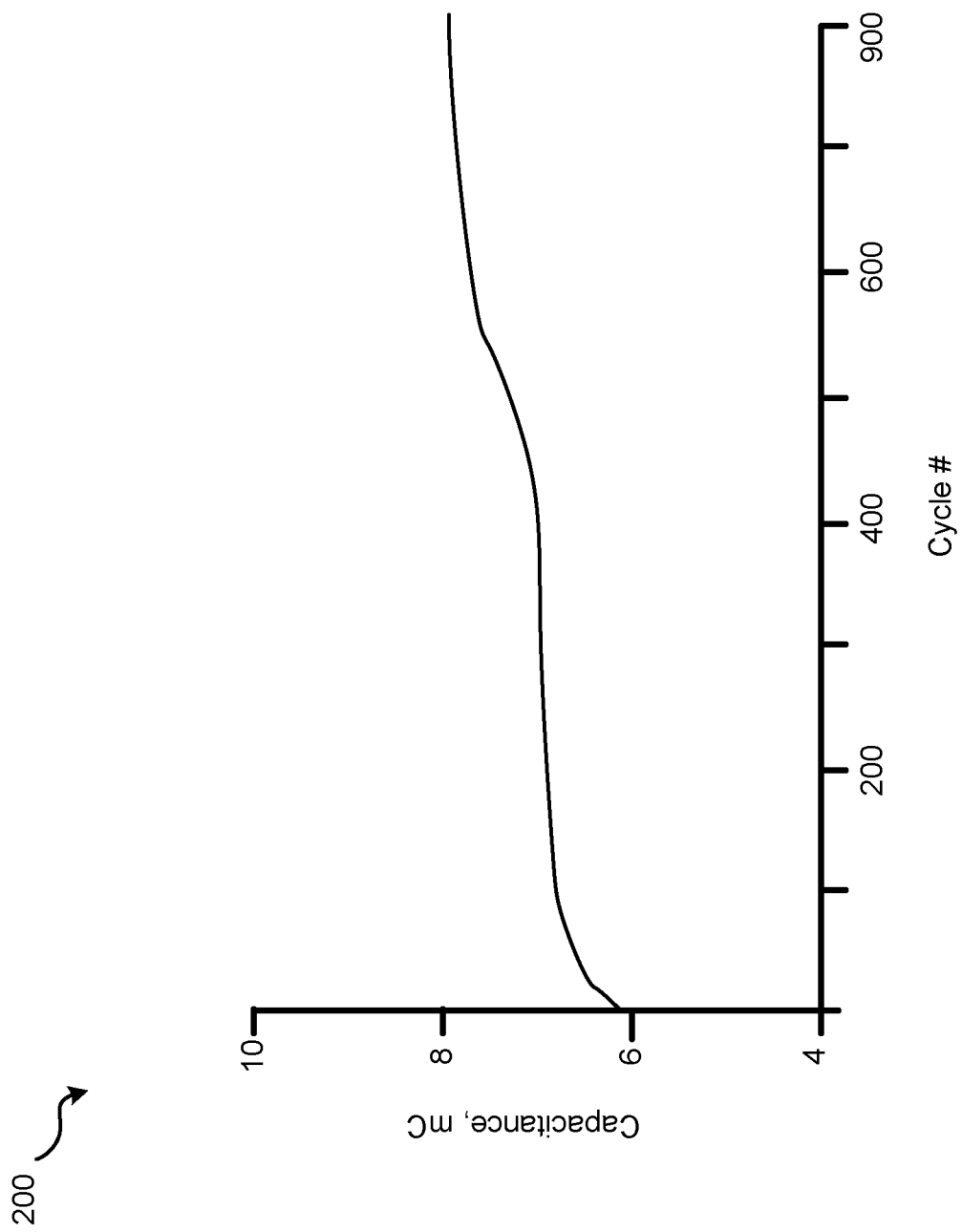
FIG. 2 shows plots of the capacitance with cycling for a nickel-cobalt oxide/hydroxide active film at 100% depth of discharge and 10% overcharge.

With reference now to FIG. 2, a plot 200 depicting a capacitance (e.g. the ability to store an electrical charge) of a nickel-cobalt oxide/hydroxide active film that remains constant or increases over greater than about 500 cycles at charge/discharge rates of 10 C, an about 100% depth of discharge (at least 95% discharge), and an about 10% overcharge according to one illustrative embodiment. As used herein, overcharge corresponds to the percentage of the nominal (or actual) charge capacity of the film being defined as 100% state-of-charge. Charge input above the 100% state-of-charge level is defined as overcharge.

According to an exemplary approach, the nickel-cobalt oxide/hydroxide may have a physical characteristic of maintaining greater than about 90% charge over greater than about 800 cycles.

In another exemplary approach, a nickel-cobalt oxide/hydroxide material has physical characteristics of maintaining 100% of an initial capacitance, over 800 cycles characterized by discharge rates of 10 C and 100% depth of discharge.

In yet another exemplary approach, a nickel-cobalt oxide/hydroxide material has physical characteristics of exhibiting an increase in capacitance, relative to an initial capacitance of the nickel-cobalt oxide/hydroxide material, over 800 cycles characterized by discharge rates of 10 C and 100% depth of discharge.

Figure 3:
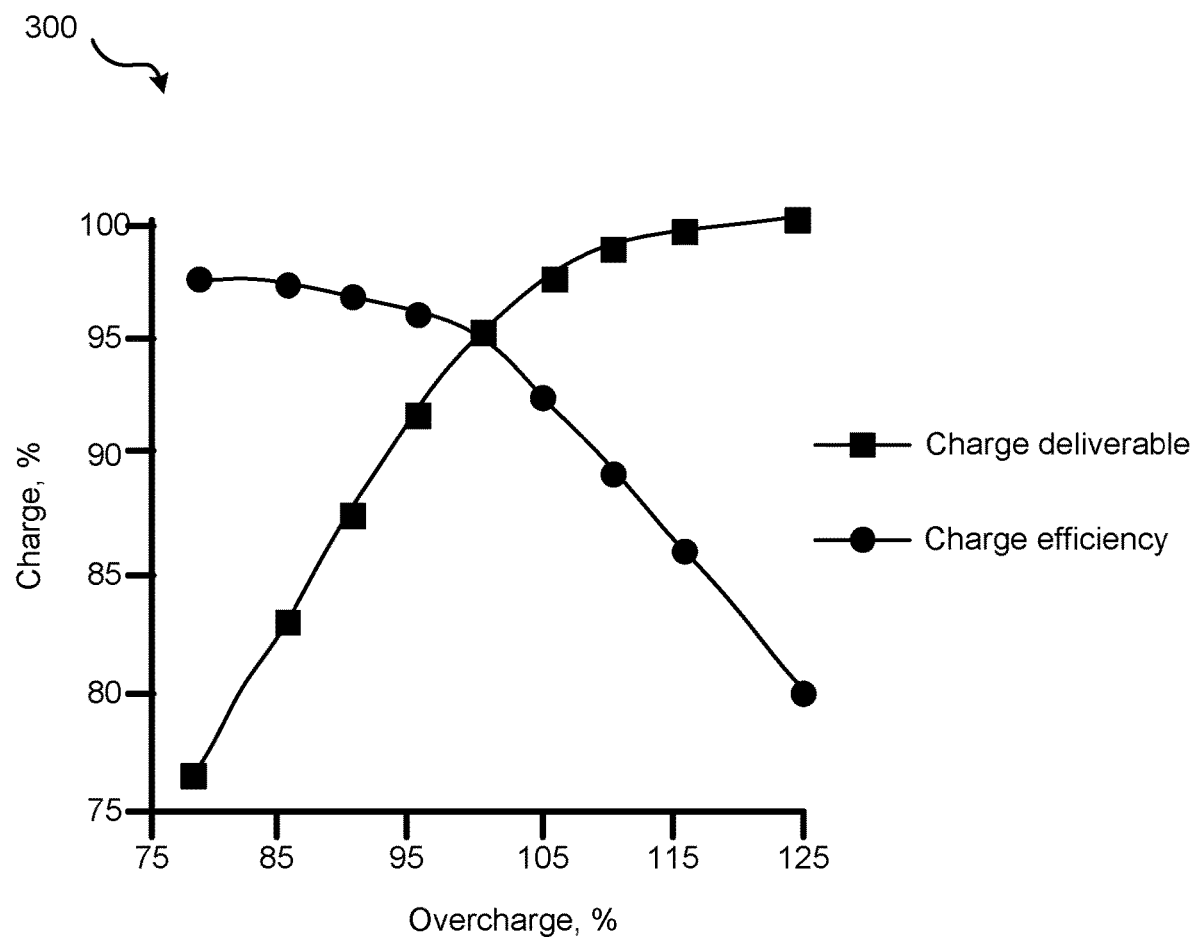
FIG. 3 shows plots of the charge efficiency (charge output/charge input) and charge deliverable (charge output delivered/maximum charge output deliverable with respect to the overcharge (charge input/maximum charge output) for a nickel-cobalt oxide/hydroxide active film.

In other illustrative approaches, the nickel-cobalt oxide/hydroxide active film may have a physical characteristic of achieving about 97% charge efficiency (e.g. charge out/charge in) at 10 C. For instance, FIG. 3 shows a plot 300 of the charge efficiency and charge deliverable (charge output delivered/maximum charge output deliverable) for the nickel-cobalt oxide/hydroxide active film according to one embodiment.

Referring now to FIG. 4, a method 400 for forming a high energy/power density material including at least a nickel oxide/hydroxide active film, is shown according to yet another embodiment. As an option, the present method 400 may be implemented in conjunction with features from any other embodiment listed herein, such as those described with reference to the other FIGS. Of course, however, such method 400 and others presented herein may be used in various applications and/or in permutations, which may or may not be specifically described in the illustrative embodiments listed herein. Moreover, more or less operations than those shown in FIG. 4 may be included in method 400, according to various embodiments.

As show in FIG. 4, the method 400 includes forming the nickel oxide/hydroxide active film onto a substrate from a solution including a nickelous salt and an electrolyte. See step 402. The nickel oxide/hydroxide active film has a physical characteristic of maintaining greater than about 80% charge over greater than 500 charge/discharge cycles. In addition, the nickel oxide/hydroxide active film also has a physical characteristic of storing electrons at greater than about 0.5 electron per nickel atom.

According to one approach, the nickelous salt may be selected from the group consisting of: nickel acetate (NiAc), $Ni(NO_3)_2$, $NiSO_4$, and $NiCl_2$. The nickelous salts may have a concentration in the solution of greater than zero to about 1.2 M in some approaches.

According to another approach, the electrolyte may be at least one of $NaNO_3$, lithium acetate (LiAc), potassium acetate (KAc), sodium acetate (NaAc), potassium fluoride (KF), sodium fluoride (NaF), $Na_2SO_4$, and LiOH. In some approaches, the electrolyte may have a concentration in solution of about 0.1 M to about 1.2 M.

Figure 5:
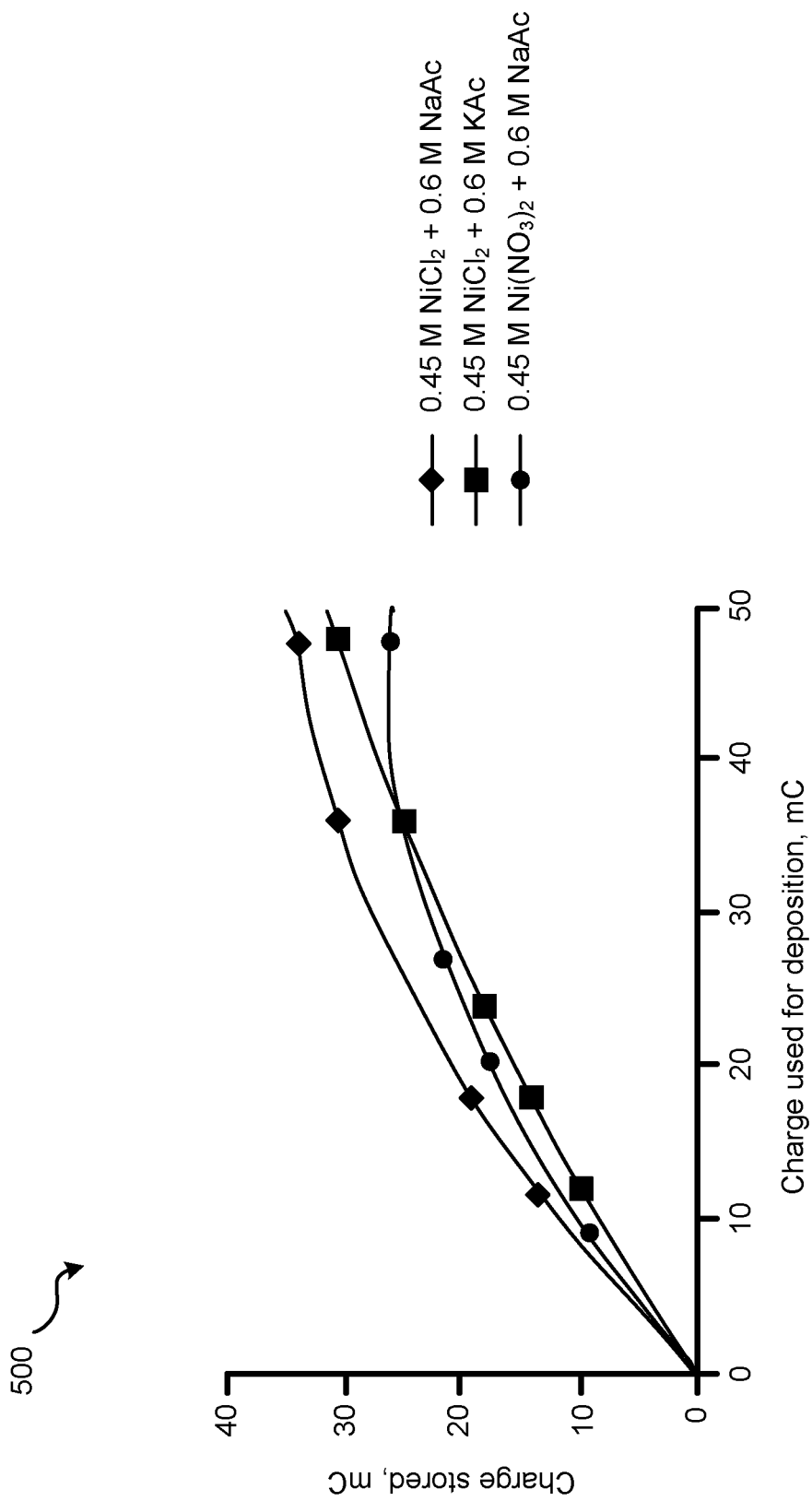
FIG. 5 shows plots of the charge stored in a nickel oxide/hydroxide active film formed from three solutions having various nickelous salts and electrolytes.

Referring now to FIG. 5, a plot 500 of the charge stored in a nickel oxide/hydroxide active film formed from three different solutions including a nickelous salts and an electrolyte is shown according to various illustrative embodiments. In a preferred embodiment, the solution including a nickelous salt and an electrolyte may include 0.45 M $NiCl_2$ and 0.6 M NaAc. As shown in FIG. 5, such a solution including 0.45 M $NiCl_2$ and 0.6 M NaAc may yield the most active nickel oxide/hydroxide active film. As used herein, the activity of the nickel oxide/hydroxide film refers to charge storage performance (e.g. the film's ability to store charge, the film's capacitance, etc.).

Figure 6:
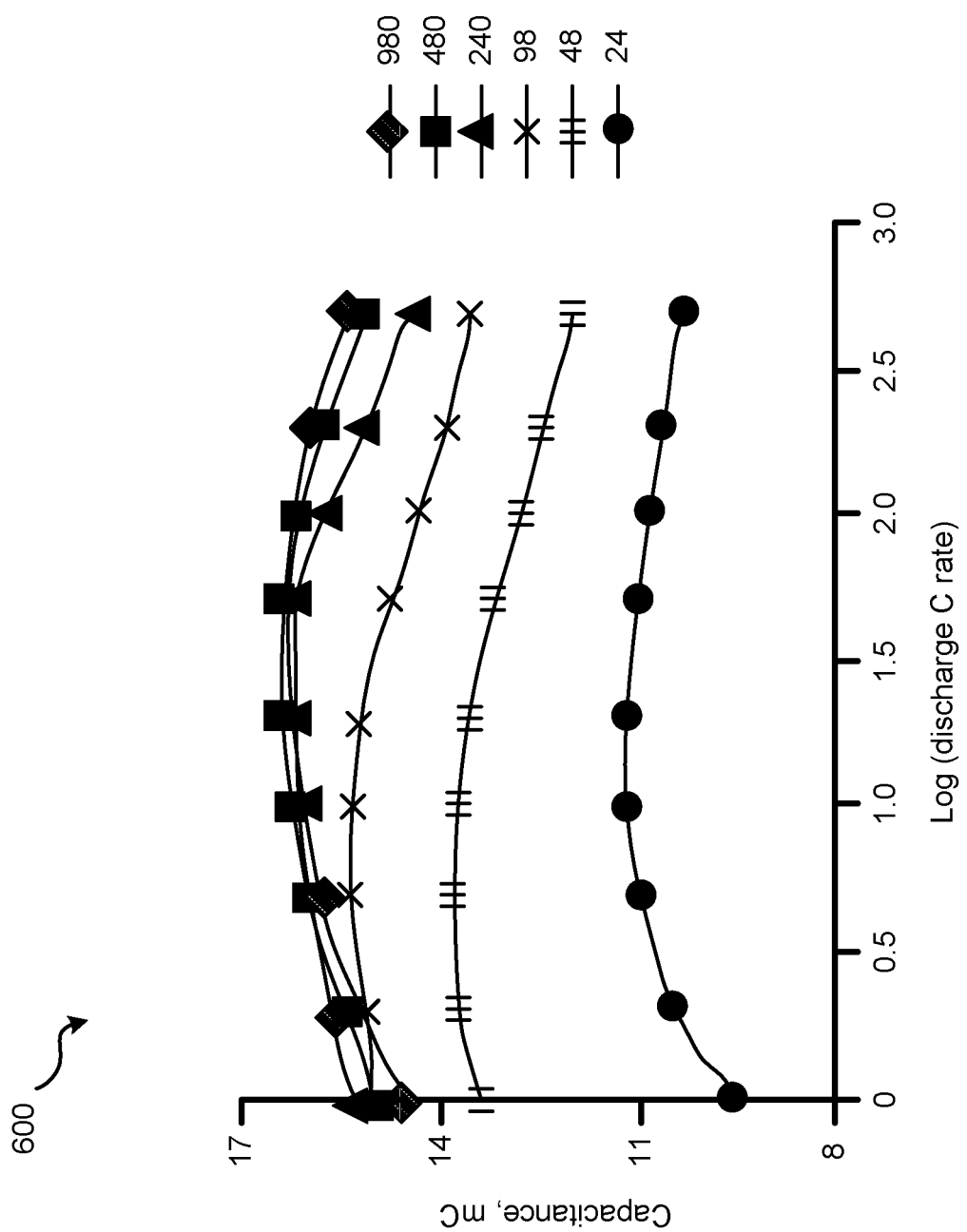
FIG. 6 shows plots of the dependence between charge storage performance and charge/discharge rates for a nickel oxide/hydroxide active film.

In numerous embodiments, the activity of a nickel oxide/hydroxide film may be affected by the film's charge/discharge rates. For example, FIG. 6 illustrates the dependence between charge storage performance and charge/discharge rates for a nickel oxide/hydroxide active film formed from a solution including 0.45 M $NiCl_2$ and 0.6 M NaAc, according to one approach. As shown in FIG. 6, a preferred charge and discharge rate of the nickel oxide/hydroxide active film with respect to charge storage performance may about 480 C and about 120 C, respectively. A rate of 980 C also showed excellent performance, inferring a preferred charge/discharge rate for this and other embodiments in a range of between about 120 C and about 880 C.

Additionally, in some approaches, a nickel oxide/hydroxide active film formed from a solution including about 0.45 M $NiCl_2$ and about 0.6 M LiAc may also exhibit large charge storage. Furthermore, in other approaches, the inclusion of up to 2 M KF (potassium fluoride) in the solution may increase the charge stored by up to 50%.

In a preferred embodiment, the electrolyte may include an acetate ion (Ac). In some approaches, the acetate ion electrolyte may be used for raising and buffering an OH— concentration to a pH range of between about 7 to about 9, which may represent an upper solubility limit for large concentrations of $Ni^{2+}$ ions (e.g. greater than 0.1 M).

Figure 7:
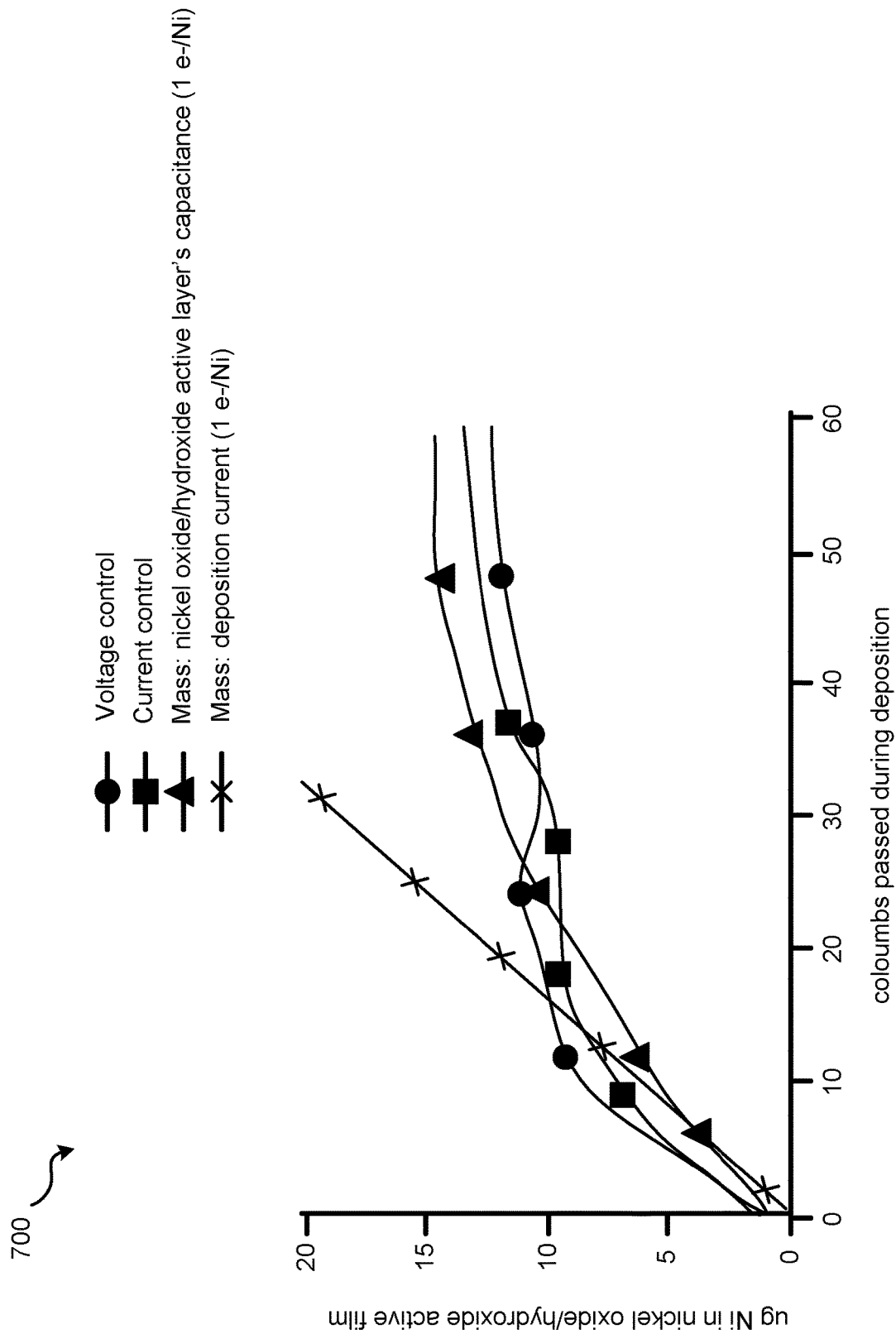
FIG. 7 shows plots of quantities of nickel deposited in a nickel oxide/hydroxide active film formed from a solution including 0.45 M $Ni(NO_3)_2$ and 0.3 M $Ni(AC)_2$.

Referring now to the chart 700 of FIG. 7, a quantity of nickel deposited in a nickel oxide/hydroxide active film formed from a solution including 0.45 M $Ni(NO_3)_2$ (a nickelous salt) and 0.3 M $Ni(AC)_2$ (an electrolyte) is shown according to another illustrative embodiment. In some approaches, the quantity of nickel deposited in the nickel oxide/hydroxide active film may be determined by dissolving the nickel oxide/hydroxide active film in nitric acid and then determining the Ni content with inductively coupled plasma mass spectrometry (ICP-MS).

As shown in FIG. 7, the mass of the nickel deposited in the nickel oxide/hydroxide active film is approximately independent of whether current (galvanostatic) or voltage (potentiostatic) control methods are used to deposit the nickel oxide/hydroxide active film. In addition, the mass of the deposited nickel as expected based on a capacitance metric is plotted in FIG. 7 using the assumption that one electron is stored per nickel atom. Further, the mass of the deposited nickel as expected from a simplified deposition mechanism, e.g. $Ni^{2+}_{(aq)} + 3\ OH^-_{(aq)} \rightarrow Ni(OH)_{3(s)} + e^-$, is also plotted in FIG. 7 using the assumption that one nickel atom is deposited for every electron passed during the deposition process. Not wishing to be bound by any particular theory, it is presently believed that the majority of the nickel initially deposited may have formed in the $Ni^{2+}$ state because there may be more Ni than could have been deposited according to the above described deposition mechanism.

Preferably, the quantity of nickel deposited in the oxide/hydroxide active film increases linearly with deposition duration so as to facilitate control over a thickness of the nickel oxide/oxide active film. In some approaches, the thickness of the nickel oxide/hydroxide active film may be in a range of about 20 to about 200 nm.

Figure 8A:
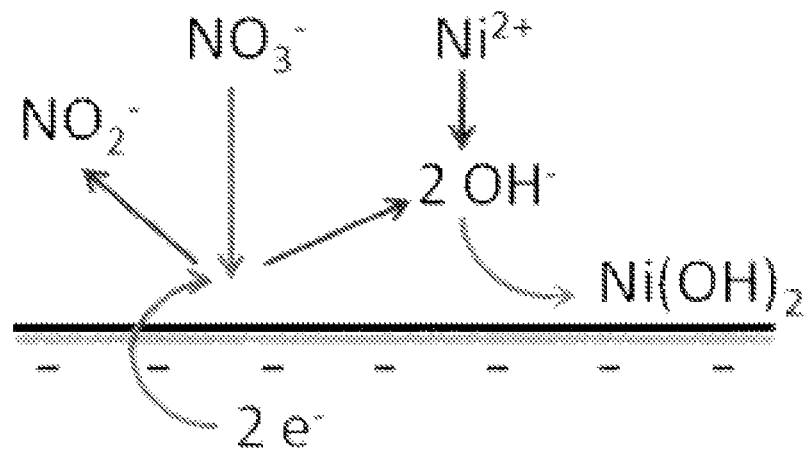
FIGS. 8A and 8B show schematics of cathodic and anodic electrodeposition of nickel oxide/hydroxide, respectively.
Figure 8B:
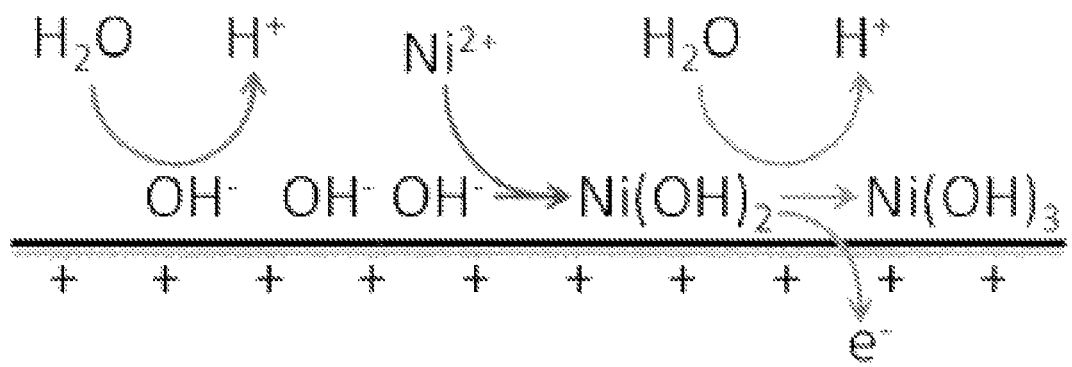

Additionally, the method 400 for forming the high energy/power density material may further comprise depositing the nickel oxide/hydroxide active film on a substrate via electrodeposition. Electrodeposition processes may include cathodic deposition (as shown in FIG. 8A), anodic deposition (as shown in FIG. 8B), etc.

In preferred embodiments, the method for forming the high energy/power density material may comprise depositing the nickel oxide/hydroxide active film on a substrate via anodic electrodeposition. In various approaches, anodic deposition may include contacting a substrate with an aqueous solution including a nickelous salt (and therefore nickelous $Ni^{2+}$ ions) and at least one electrolyte, followed by application of a current/voltage to the substrate in order to deposit the nickel as a nickel oxide/hydroxide active film coating the substrate. Preferably, the anodic deposition may result in a substantially even distribution of a nickel oxide/hydroxide active film over the substrate or other complex surfaces due, at least in part, to kinetically governed surface-dependent reactions. For example, the anodic deposition may produce a nickel oxide/hydroxide film with controllable and uniform thickness (e.g. the thickness may vary less than about ±1 nm along all codeposited portions thereof) in some approaches.

In various approaches, the stability of a nickel oxide/hydroxide active film formed, e.g. via anodic electrodeposition, may be affected by the film's charge and discharge rates. As noted above, the stability of the nickel oxide/hydroxide film may be defined as the ability to discharge nearly the same amount of charge through repeated charge/discharge cycles. In some approaches, a benchmark for the stability of the nickel oxide/hydroxide active film may comprise maintaining, retaining, etc. greater than about 80% of its charge storage capacity when the nickel oxide/hydroxide active film is charged at preferred C rates, e.g. 480 C, and overcharged by about 30% (e.g. where the amount of charge applied to the nickel oxide/hydroxide active film is about 130% of the storable charge in the material).

In further approaches, the method for forming the high energy/power density material comprising a nickel oxide/hydroxide active film may further include modifying the pH of the solution including the nickelous salt and an electrolyte. In some instances, modifying the pH of this solution may affect the deposition efficiency of the nickel oxide/hydroxide active film on the substrate as well as the charge storage of the nickel oxide/hydroxide active film. Consequently, in some approaches, the nickel oxide/hydroxide active film may be charged/discharged in solutions with a pH range of about 1 to about 6 M KOH. In preferred approaches, the nickel oxide/hydroxide active film may be charged/discharge in about 3 M or about 6 M KOH.

Further, in yet another embodiment, the method for forming a high energy/power density material may include forming a nickel-cobalt oxide/hydroxide active film onto a substrate from a solution including a nickelous salt and a cobalt electrolyte.

In one approach, the nickel-cobalt oxide/hydroxide active film may be deposited on a substrate via electrodeposition, preferably anodic electrodeposition.

In conventional use, the inclusion of cobalt (Co) in battery materials is thought to persist in the inactive yet conductive $3^+$ state. However, the inclusion of 1 $Co^{2+}$:100 $Ni^{2+}$ in the solution, e.g. the anodic electrodeposition solution, may result in nickel oxide/hydroxide active film having a cobalt to nickel ratio of about 2:1 in some approaches. In other approaches, the nickel-cobalt oxide hydroxide active film formed from a solution containing a nickelous salt and a cobalt electrolyte may have a cobalt to nickel ratio in a range from about 1:2 to about 2:1.

In another approach, the cobalt oxide/hydroxide may deposit faster than nickel at lower deposition potentials.

In yet another approach, the nickel-cobalt oxide/hydroxide active film may store greater than about 0.5 electron per metal atom.

In further approaches, the solution including a nickelous salt and a cobalt electrolyte may contain also contain a second electrolyte in addition to the cobalt electrolyte, such as LiAc, NaAc, KAc, $NaNO_3$, NaF, KF and $Na_2SO_4$.

Figure 9:
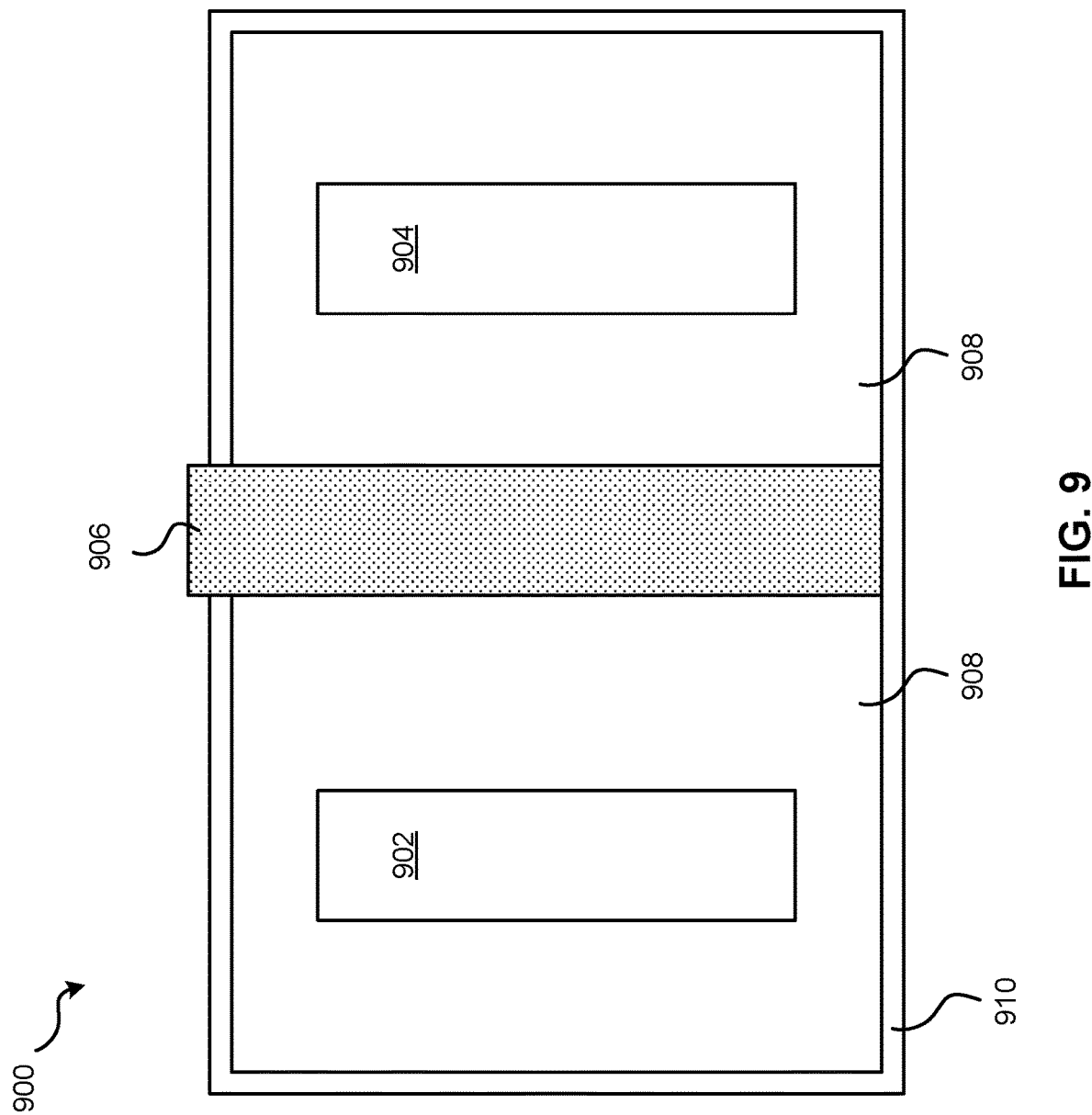
FIG. 9 shows a schematic of a battery according to one embodiment.

Referring now to FIG. 9, a battery 900 is shown according to one embodiment. As an option, the battery 900 may be implemented in conjunction with features from any other embodiment listed herein, such as those described with reference to the other FIGS. Of course, however, said battery 900 may be used in various applications and/or in permutations, which may or may not be specifically described in the illustrative embodiments listed herein.

As shown in FIG. 9, a battery 900 may include a cathode 902, an anode 904, an electrolyte permeable separator 906 between the anode and the cathode, and an electrolyte solution 908 contacting both the anode 904 and the cathode 902. In addition, the battery may include a housing 910.

In some approaches, the anode 904 may include an anode active material comprising zinc or zinc alloy particles. In other approaches, the electrolyte solution 908 may include an aqueous solution of potassium hydroxide, sodium hydroxide, lithium hydroxide, etc.

In one embodiment, the battery 900 may include a cathode 902 comprising: a substrate having the nickel oxide/hydroxide active film deposited thereon, where the nickel oxide/hydroxide active film has a physical characteristic of maintaining greater than about 80% charge over greater than 500 charge/discharge cycles and also has a physical characteristic of storing electrons at greater than about 0.5 electron per nickel atom.

While various embodiments have been described above, it should be understood that they have been presented by way of example only, and not limitation. For example, any one embodiment may be implemented in conjunction with features from any other embodiment listed herein, such as those described with reference to the other FIGS. Further, the embodiments may be used in various applications, devices, systems, methods, etc. and/or in various permutations, which may or may not be specifically described in the illustrative embodiments listed herein. Thus, the breadth and scope of the embodiments should not be limited by any of the above-described exemplary embodiments, but should be defined only in accordance with the following claims and their equivalents.

What is claimed is:

1. A method, comprising:
   forming a nickel oxide/hydroxide active film via anodic electrodeposition onto a substrate from a solution including a nickelous salt and an electrolyte;
   wherein the substrate comprises ordered, pyrolytic graphite;
   wherein the electrolyte comprises at least one constituent selected from the group consisting of: an acetate, a nitrate, a sulfate; a hydroxide, and a fluoride;
   wherein the nickelous salt and the electrolyte are each present in a concentration from about 0.45 molar to about 1.2 molar;

wherein the nickel oxide/hydroxide active film has a physical characteristic of exhibiting an increase in capacitance relative to an initial capacitance of the nickel oxide/hydroxide active film, over greater than 500 charge/discharge cycles; and wherein the nickel oxide/hydroxide active film has a physical characteristic of storing electrons at about 1.33 electrons per nickel atom.

2. The method of claim 1, wherein the nickelous salt comprises $NiCl_2$.

3. The method of claim 1, wherein the electrolyte is $NaNO_3$.

4. The method of claim 1, wherein the nickelous salt is present in an amount of about 1.2M;
wherein the nickelous salt comprises NiAc;
wherein the electrolyte is present in an amount of about 1.2M; and
wherein the electrolyte is selected from the group consisting of: LiAc, KAc, NaAc, KF, NaF, LiOH; and combinations thereof.

5. The method of claim 1, wherein the electrolyte is selected from a group consisting of: LiAc, KAc NaF, and KF.

6. The method of claim 1, wherein the electrolyte comprises one or more species selected from the group consisting of: LiAc, KAc, NaAc, KF, NaF, and LiOH.

7. A method, comprising:
forming a nickel oxide/hydroxide active film via anodic electrodeposition onto a substrate from an acidic solution including a nickelous salt and an electrolyte;
wherein the substrate comprises ordered, pyrolytic graphite;
wherein the electrolyte comprises at least one constituent selected from the group consisting of: an acetate, a nitrate, a sulfate; a hydroxide, and a fluoride;
wherein the nickel oxide/hydroxide active film has a physical characteristic of exhibiting an increase in capacitance relative to an initial capacitance of the nickel oxide/hydroxide active film, over greater than 500 charge/discharge cycles; and
wherein the nickel oxide/hydroxide active film has a physical characteristic of storing electrons at greater than about 1.0 electrons per nickel atom.

8. The method of claim 1, wherein the nickel oxide/hydroxide active film formed on the substrate has a thickness in a range from about 20 to about 200 nm.

9. The method of claim 8, wherein the thickness of the nickel oxide/hydroxide active film varies less than about ±1 nm along all codeposited portions thereof.

10. The method of claim 1, wherein the nickel oxide/hydroxide active film includes cobalt.

11. The method of claim 10, wherein the nickel oxide/hydroxide active film comprises a cobalt (Co) to nickel (Ni) ratio of about 2:1 to about 1:2.

12. The method of claim 1, wherein the nickelous salt comprises NiAc.

13. The method of claim 1, wherein each of the charge/discharge cycles is characterized by a charge rate of about 10 C and a depth of discharge of about 100%.

14. The method of claim 1, comprising either charging or discharging the nickel oxide/hydroxide active film in a second solution of KOH, wherein the KOH is present in an amount from 3 M to about 6 M.

15. The method as recited in claim 7, wherein
the nickelous salt comprises 0.45 M $Ni(NO_3)_2$; and
wherein the electrolyte comprises 0.3 M $Ni(Ac)_2$.

16. The method of claim 7, wherein the nickelous salt comprises a nickelous component and a pH-neutral anionic component;
wherein the electrolyte comprises at least one pH-neutral component;
wherein the nickelous component comprises NiAc; and
wherein the electrolyte comprises one or more species selected from the group consisting of: LiAc, KAc, NaAc, KF, NaF, and LiOH.

17. The method of claim 7, wherein each of the charge/discharge cycles is characterized by a charge rate of about 10 C and a depth of discharge of about 100%.

18. The method of claim 1, wherein the substrate is porous.

19. The method of claim 1, further comprising charging and discharging the nickel oxide/hydroxide active film, wherein the charging and discharging is characterized by a charge/discharge rate in a range from about 100 C to about 1000 C.

20. The method of claim 13, comprising either charging or discharging the nickel oxide/hydroxide active film in a second solution of KOH, wherein the KOH is present in an amount from 3 M to about 6 M;
wherein the nickelous salt comprises Ni present in an amount of about 1.2M; and
wherein the electrolyte comprises at least one material selected from a group consisting of: LiAc, KAc; NaAc, NaF, LiOH, and KF;
wherein the electrolyte is present in an amount of about 1.2M;
wherein the substrate is porous;
wherein some or all pores of the substrate are characterized by a pore size of 0.1 µm;
wherein the pores of the substrate are characterized by a substantially uniform distance therebetween; and
wherein the nickel oxide/hydroxide active film:
comprises cobalt;
exhibits a cobalt (Co) to nickel (Ni) ratio of about 2:1 to about 1:2;
has a thickness in a range from about 20 to about 200 nm, wherein the thickness of the nickel oxide/hydroxide active film varies less than about ±1 nm along all codeposited portions thereof; and
has physical characteristics of:
a charge/discharge rate of greater than about 100 C; and
about 97% charge efficiency.

* * * * *